United States Patent
Gohil et al.

(10) Patent No.: US 10,171,623 B1
(45) Date of Patent: Jan. 1, 2019

(54) IDENTIFYING APPLICATION PREEMPTIVE REQUESTS

(71) Applicant: International Business Machines Corporation, Armonk, NY (US)

(72) Inventors: Pradeep Gohil, Eastleigh (GB); Anthony P. Papageorgiou, Hampshire (GB); Stephen J. Hobson, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/844,716

(22) Filed: Dec. 18, 2017

Related U.S. Application Data

(63) Continuation of application No. 15/652,279, filed on Jul. 18, 2017.

(51) Int. Cl.
  *G06F 15/16* (2006.01)
  *H04L 29/08* (2006.01)

(52) U.S. Cl.
  CPC .............. *H04L 67/32* (2013.01); *H04L 67/10* (2013.01)

(58) Field of Classification Search
  CPC ..... H04L 67/22; H04L 67/2847; H04L 67/42; H04L 67/2842; H04L 67/1097
  See application file for complete search history.

(56) References Cited

U.S. PATENT DOCUMENTS

| | | | |
|---|---|---|---|
| 8,516,041 B1 | 9/2013 | Miles | |
| 8,990,779 B2 | 3/2015 | Schalk | |
| 9,514,028 B2 | 12/2016 | Grawrock et al. | |
| 2012/0151000 A1 | 6/2012 | Snodgrass et al. | |
| 2014/0188889 A1 | 7/2014 | Martens et al. | |
| 2016/0065497 A1 | 3/2016 | Coulmeau et al. | |
| 2016/0112822 A1* | 4/2016 | Giral | H04W 4/003 455/414.1 |
| 2016/0335126 A1 | 11/2016 | Miller et al. | |
| 2017/0171311 A1* | 6/2017 | Tennie | H04L 67/1097 |
| 2017/0195438 A1* | 7/2017 | Schneider | H04L 67/325 |

OTHER PUBLICATIONS

"ARM—Application Response Management", SAS, © SAS Institute Inc., printed May 30, 2017, 1 page.
Gohil et al., "Application Execution Environment", U.S. Appl. No. 15/378,327, filed Dec. 14, 2016, 30 pages.
(Continued)

*Primary Examiner* — Yves Dalencourt
(74) *Attorney, Agent, or Firm* — Gilbert Harmon, Jr.

(57) ABSTRACT

A method for optimizing the number of pre-emptive service requests in an application based on identifying a plurality of pre-emptive execution eligible service requests. The method includes identifying one or more locations, associated with one or more service requests, respectively, in an application. Analyzing the one or more service requests based on the one or more locations. Determining if the one or more service requests are eligible for pre-emptive execution based on the analyzing, and responsive to determining the one or more service requests are eligible, outputting, by the one or more processors, one or more identities of the one or more service requests, respectively, for pre-emptive execution.

1 Claim, 8 Drawing Sheets

(56) References Cited

OTHER PUBLICATIONS

Gohil et al., "Running an Application Within an Application Execution Environment and Preparation of an Application for the Same", U.S. Appl. No. 15/279,788, filed Sep. 29, 2016, 33 pages.

Mell et al., The NIST Definition of Cloud Computing, Recommendations of the National Institute of Standards and Technology, U.S. Department of Commerce, Special Publication 800-145, Sep. 2011, 7 pages.

Gohil et al., "Identifying Application Preemptive Requests", U.S. Appl. No. 15/652,279, filed Jul. 18, 2017, 34 pages.

IBM Appendix P, list of patents or patent applications treated as related, filed herewith, 2 pages.

* cited by examiner

IDENTIFYING APPLICATION PREEMPTIVE REQUESTS

BACKGROUND OF THE INVENTION

The present invention relates generally to service requests in applications and more specifically, to optimizing the number of pre-emptive service requests in an application.

Distributed processing systems and applications typically require a level of integration between applications. For instance, it is often required for an application to rely on a service provided by service provider, wherein the service provider can be on-premise (e.g. provided locally in a distributed processing environment, such as within a local area network) or off-premise (e.g. provided remotely, such as via the Internet and/or within a cloud computing environment).

Response time is a key factor in application execution, wherein it is widely recognized that a shorter response time is typically beneficial. The response time of an application can be adversely affected by services which are called by the application. For example, an application can arrive at logic/instructions requiring the results/output from a service and can then have to wait for the result/output from the service to be provision, thus increasing the response time of the application.

In an attempt to address such an issue, a service can be called earlier on in the application logic flow (e.g. pre-emptively requested), so that, by the point in the logic/instruction flow that the result/output from the service is required, the result/output from the service is available (or a shorter wait for the result/output is required). However locating and/or identifying pre-emptive service requests can be very cumbersome.

SUMMARY

According to an embodiment of the present invention a computer-implemented method for optimizing the number of pre-emptive service requests in an application based on identifying a plurality of pre-emptive execution eligible service requests. The method includes, identifying, by one or more processors, one or more locations, associated with one or more service requests, respectively, in an application wherein the service request comprises a request for a micro-service. Analyzing, by the one or more processors, the one or more service requests based on the one or more locations, wherein analyzing comprises at least one of: interpreting source code of the application, logic flow of the application. a component of the application, a resource of the application, external calls of the application, internal calls of the application, timing of application events, status changes of the application, input data flows of the application, or output data flows of the application. Determining, by the one or more processors, if the one or more service requests are eligible for pre-emptive execution based on the analyzing, wherein determining service request eligibility is based on trace information obtained from an execution of the application, and wherein the determining service request eligibility comprises a trace element that generates a trace event during execution of the application, and wherein the trace information comprises information relating to the trace event, and wherein determining comprises: monitoring execution of the application based on at least one of time of events, external calls, internal calls, resource usage, I/O data, status, usage counts or execution time. Responsive to determining the one or more service requests are eligible, outputting, by the one or more processors, one or more identities of the one or more service requests, respectively, for pre-emptive execution, wherein the one or more identities comprise one or more indicators of suitability for pre-emptive execution, wherein the one or more indicators of suitability for pre-emptive execution comprise at least one of: input data, output data, service request timing, service request type, execution context, service request originator, or a service request identifier.

BRIEF DESCRIPTION OF THE DRAWINGS

Preferred embodiments of the present invention will now be described, by way of example only, with reference to the following drawings, in which.

DETAILED DESCRIPTION

Figure 1:
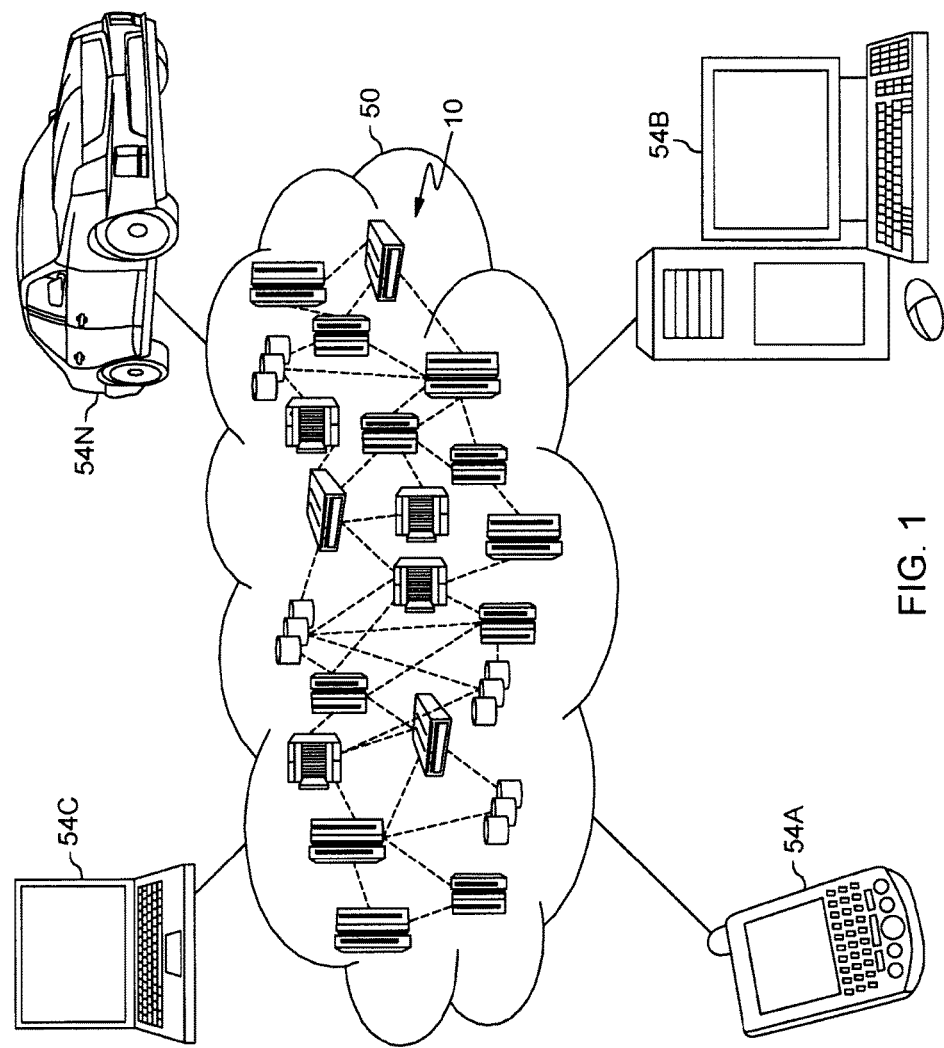
FIG. 1 depicts a cloud computing environment according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (application processing) system can be a single device or a collection of distributed devices that are adapted to execute one or more embodiments of the methods of the present invention. For instance, a system can be a personal computer (PC), a server or a collection of PCs and/or servers connected via a network such as a local area network, the Internet and so on to cooperatively execute at least one embodiment of the methods of the present invention.

The present invention seeks to provide a method for identifying pre-emptive service requests that can provide support for integrating applications or services in scalable service architectures (e.g. a cloud computing environment). The present invention further seeks to provide a computer program product including computer program code for implementing the method when executed on a processor of a processing system. The present invention yet further seeks to provide a processing system adapted to execute this computer program code.

Proposed are concepts for analyzing an application that can comprise a large or very large number (e.g. 10,000+) of separate programs (such as an application in a CICS installation). The analysis can identify and/or assist an application owner to identify services and/or service requests/calls where issuing a pre-emptive request/call can help to reduce response times. Thus, embodiments can be particularly for use in conjunction with a run-time environment that is capable of calling services pre-emptively. However, it is also envisaged that embodiments can be used in a 'stand-alone' manner. For example, embodiment can be used in a tool that identifies cases where an existing application could be enhanced by modifying it to call certain services pre-emptively.

Embodiment of the present invention can identify a pre-emptive service request for an application by analyzing the application to identify a service request of the application. By referring to indicators of suitability for pre-emptive execution, it can be determined whether or not the service request can be executed pre-emptively (e.g. at an earlier point in the application logic of the application). Such embodiments of the present invention can be implemented as a software tool, thus facilitating the identification of services that can be requested earlier in application logic and when such a service can be able to be called.

By interrogating application execution using software tooling focused on execution trace, monitoring information, and/or application source code, embodiments of the present invention can identify one or more service requests that can be invoked at an earlier point in the application logic; therefore, improving the art by optimizing the identification of eligible pre-emptive service requests in an application. Embodiments can therefore enable a search for pre-emptive services within application code to be conducted programmatically (e.g. via tooling) where a large number of applications exist. By invoking these service requests earlier than would otherwise be done in the normal execution of the application, overall application response time can be reduced (e.g. because the waiting time for the service request can be reduced or even eliminated).

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Illustrative embodiments can be utilized in many different types of application processing environments. Illustrative embodiments can, for example, be employed in relation to stateless and scalable cloud-based applications for data and/or event processing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
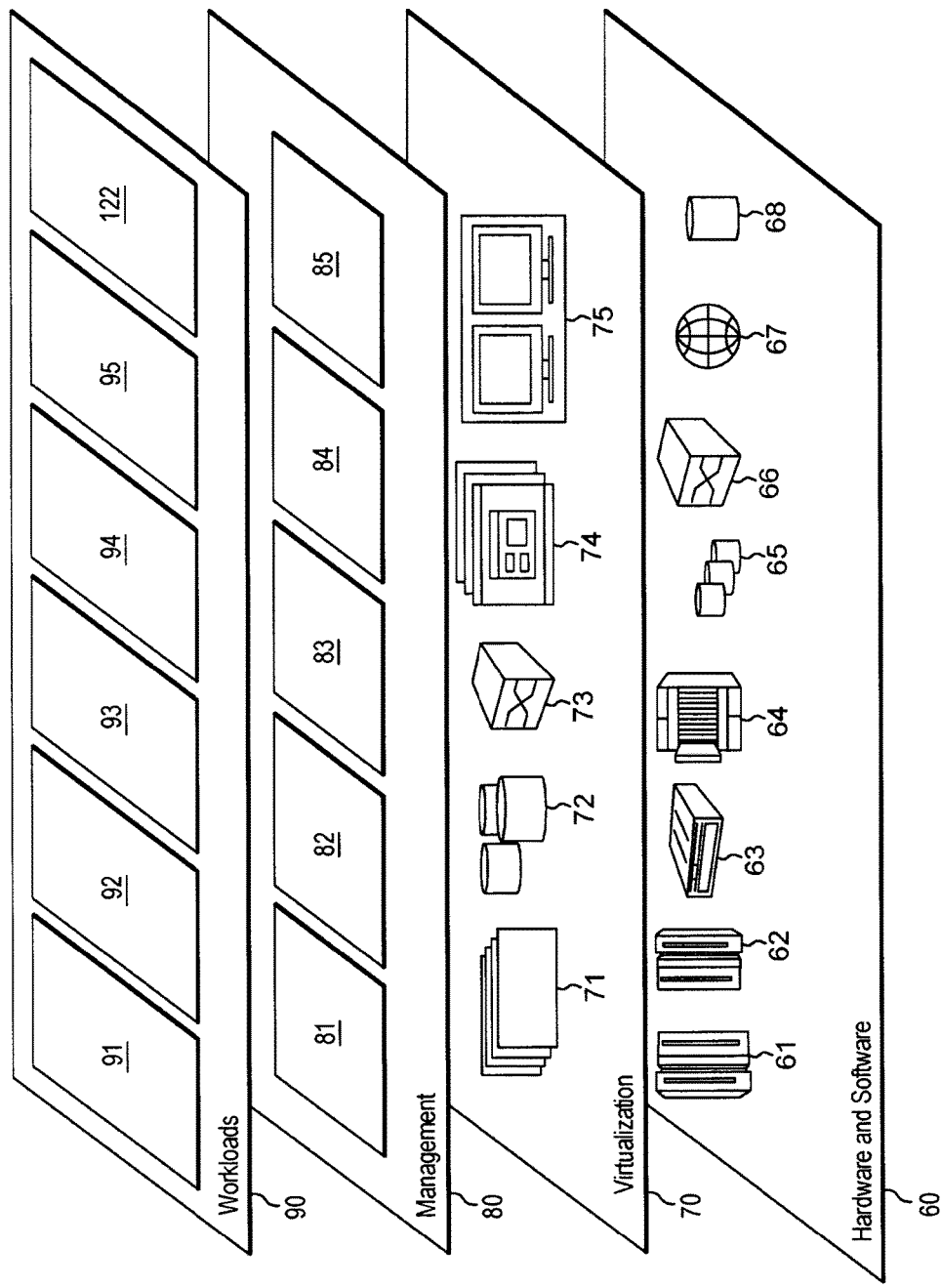
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Application processing 85 provides application processing according to proposed embodiments.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and pre-empting service component 122.

A proposed concept can enhance an event processing system by reducing costs per user while maximizing quality of service. Embodiments can also enable flexibility to provide higher qualities of service for particular users (e.g. user paying an additional fee). Such proposals can extend or improve the processing capabilities or efficiency of an Integration Software as a Service (iSaaS) system or component.

Figure 3:
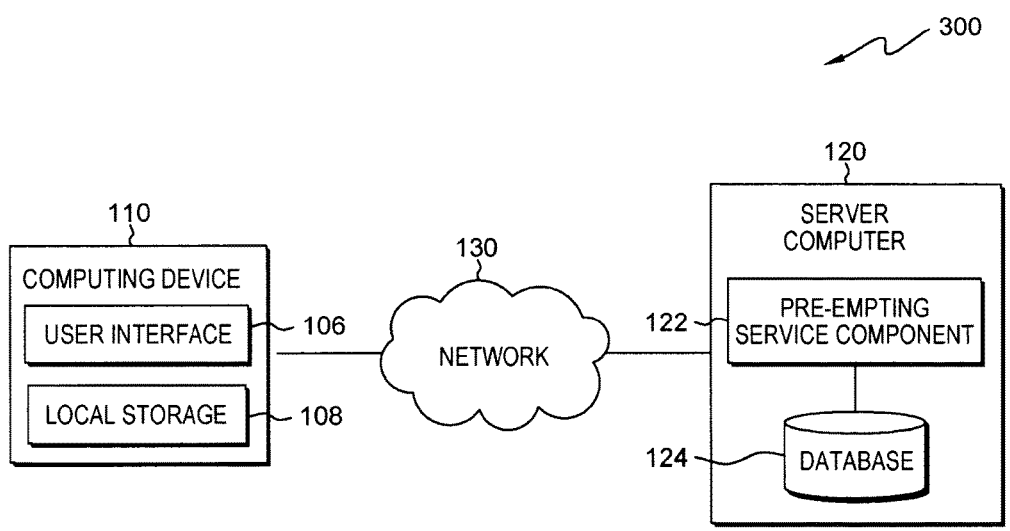
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments can be implemented. Many modifications to the depicted environment can be made by those skilled in the art without departing from the scope of the invention as recited by the claims.

Distributed data processing environment 00 includes computing device 110 and server computer 120, interconnected over network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, any programmable electronic computing device capable of communicating with various components and devices within distributed data processing environment 100, via network 120 or any combination therein. In general, computing device 110 is representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with pre-empting service component 122 in various ways, such as sending program instructions, receiving messages, sending data, inputting data, editing data, correcting data and/or receiving data.

User interface 106 provides an interface to pre-empting service component 122 on server computer 120 for a user of computing device 110. In one embodiment, user interface 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 can also be mobile application software that provides an interface between a user of computing device 110 and server computer 120. Mobile application software, or an "app," is a computer program designed to run on smart phones, tablet computers and other mobile devices. In an embodiment, user interface 106 enables the user of computing device 110 to send data, input data, edit data, correct data and/or receive data.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 includes pre-empting service component 122 and database 124. Server computer 120 can include internal and external hardware components, as depicted and described in further detail with respect to FIG. 3.

Database 124 and/or local storage 108 can be a data repository and/or a database that can be written to and read by one or a combination of disease progression component 110, server computer 120 and/or computing device 110. In the depicted embodiment, database 124 resides on server computer 120 and local storage 108 is housed on computing device 110. However, in another embodiment, database 124 and/or local storage 108 can reside elsewhere within distributed data processing environment 100 provided coverage assessment program 110 has access to database 124. A database is an organized collection of data. Database 124 and/or local storage 108 can be implemented with any type of storage device capable of storing data and configuration files that can be accessed and utilized by server computer 120 and/or computing device 110, such as a database server, a hard disk drive, or a flash memory. In other embodiments, database 124 and/or local storage 108 can be hard drives, memory cards, computer output to laser disc (cold storage), and/or any form of data storage known in the art. In various embodiments can store data and/or discovered shortcuts to database 124 and/or local storage 108. In various embodiments, pre-empting service component 122 can retrieve, access, and/or use previously stored data from database 124 and/or local storage 108.

In an exemplary embodiment, pre-empting service component 122 is housed on server computer 120. In some embodiments, pre-empting service component 122 can be housed on computing device 110. In other embodiments, pre-empting service component 122 can be a standalone device and/or housed on a separate component (computing device and/or server computer) not depicted in FIG. 3. In various embodiments, pre-empting service component 122 can identify service requests that can be invoked at an earlier point in the application logic. It should be noted that the service request can include a path and/or route for pre-emptive execution, as it is understood in the art.

For example, if a user assumes an application which at some point in its processing is required to get a customer's address in view of a given house number and/or postcode, it is typical that the application will have done some sort of processing before it gets to the stage of requiring the address. The application will then request the address from the external service and wait for the response. Once the address reply is obtained, the application can continue. In this particular example, pre-empting service component 122 can identify that the service request can safely be made (e.g. communicated or executed) at an earlier point in the application logic. Based on this identification, the source code can be modified so that, when run, the service request for the address can be made as soon as the transaction is started (or at least when a required input for the service request is available).

In various embodiments, pre-empting service component 122 can provide for a decrease in an overall application response time, and this can be provided with a decreased risk associated with a change and/or a reduced initial understanding of the application. In various embodiments, pre-empting service component 122 can also address the issue that, when presented with all of an organization's application logic, it is practically impossible for a human to articulate the best services to be made pre-emptively (because it can require a deep understand of every application). In various embodiments, pre-empting service component 122 can identify services that can be pre-emptively called (e.g. executed early and/or in advance of the point at which they would normally be according to the conventional application logic).

In one embodiment, a pre-empting service component 122 can determine if the service request can be executed at an earlier point in the application logic of an application, and can determine the service request is based on trace information obtained from an execution of the application. For example, the application can comprise a trace element that generates a trace event during execution of the application, and the trace information can then comprise information relating to the trace event. Examples of trace information can include, but are not limited to: time of the event; data associated with the event; event type; I/O data; response codes; etc. In this way, embodiments can implement trace analysis concepts.

By way of another example, a step of determining if the service request can be executed at an earlier point in the application logic of the application can be based on monitoring information obtained from monitoring an execution of the application. Examples of monitoring information can include: time of events; external/internal calls; resource usage; I/O data; status; usage counts; execution time; etc.

In another example, analyzing the application can involve analyzing at least one of: source code of the application: application logic of the application; a component or resource of the application; status changes of the application; and input/output data flows of the application.

In determining whether an identified service request is suitable for pre-emptive execution, a property or characteristic of the identified service request can be considered against one or more indicators of suitability for pre-emptive execution. Such indicators can, for example, include predetermined types or value of: input data; output data; service request timing; execution context (e.g. service execution context within the application); service request type; service request originator; and a service request identifier. For instance, the identified service can be checked against a list or services that are suitable for pre-emptive execution (either because they are called in a transaction or because they are read-only for example).

Illustrative embodiments can therefore provide a tool that helps identify service requests for pre-emptive calling. It can do this by analyzing the processing performance performed by a system in response to specific requests. Proposed concepts can thus provide information that can be used to decide which cases merit further investigation. Such investigation can then result in outputting identities of service requests for pre-emptive execution, which can lead to optimizing the identification of eligible pre-emptive service requests in an application.

Rather than analyzing input data at the time the data is entered, proposed embodiments can analyze the process of processing input data, for example by analyzing program code or traces of program execution. Further, embodiments can avoid using categorization to establish potential relevance/utility of pre-emptive calls. Instead, proposed embodiments can observe actually service requests/calls used in existing processing and then identify those that can benefit from pre-emptive processing/execution.

Many different ways to identify pre-emptive service requests can be employed by embodiments, and these can be implemented in isolation or in combination. Modifications and additional steps to a traditional (application) processing systems can also be proposed which can enhance the value and utility of the proposed concepts.

Figure 6:
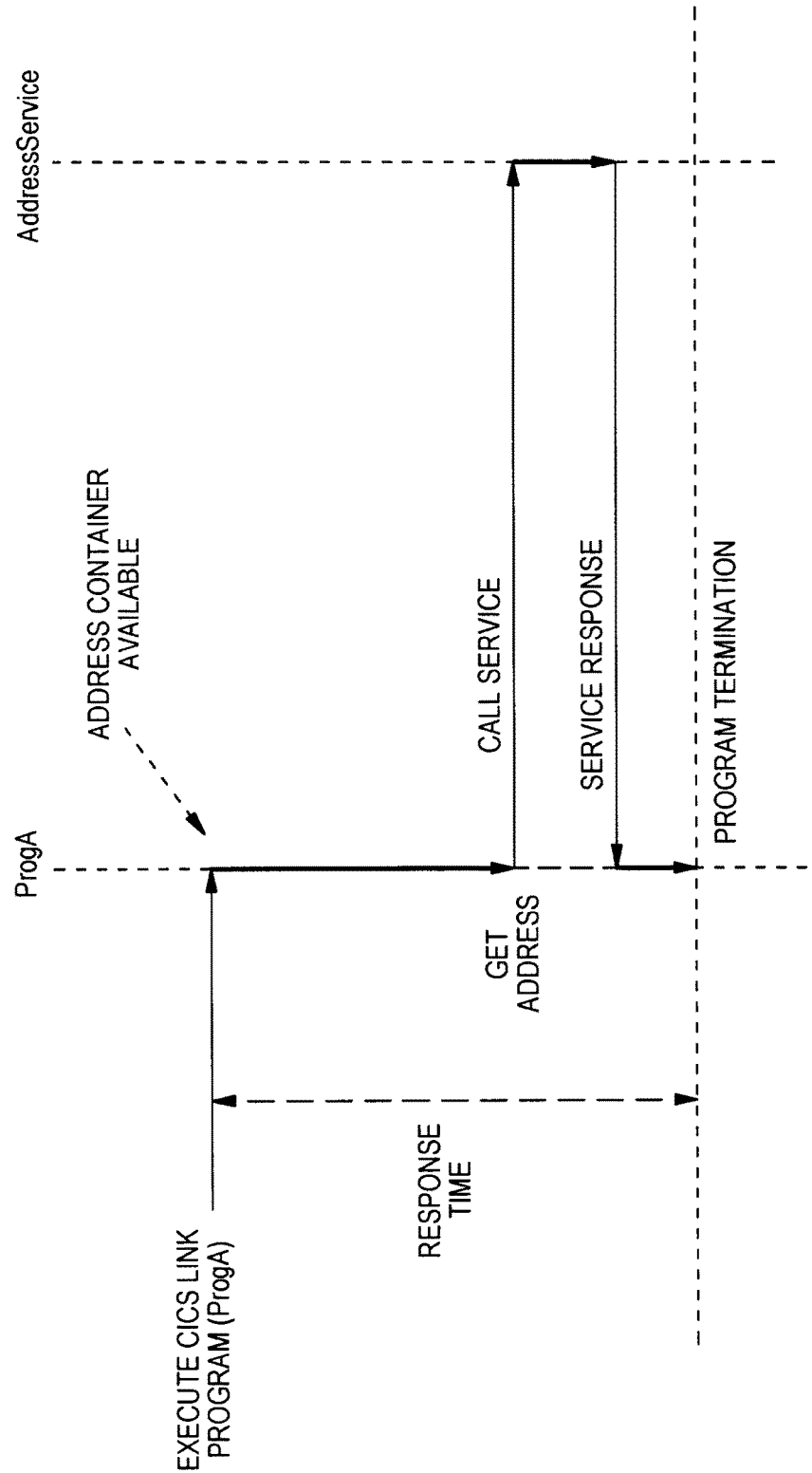
FIG. 6 depicts one embodiment of the present invention.

An example according to the above method depicted in FIG. 6 can be implemented in a Customer Information Control System (CICS®) execution environment and workstation tooling environment. FIG. 6 illustrates a process flow wherein an application requests the canonical address of a user based upon the house number and postcode provided to the application. However, it will be appreciated that there are other environments and platforms to which embodiment can be appropriate. Also, although embodiments of pre-empting service component 122 have been described as providing and/or implementing tools for interrogating application execution traces, in other embodiments pre-empting service component 122 can provide and/or implement tools for interrogating collected monitoring information and/or original source code.

A CICS® provides an environment in which applications are run. The CICS programming interface provides clearly identifiable points of application logic where user data is updated (such as GET/PUT containers) as well as the input and time of service invocations (such as PROGRAM LINK, INVOKE SERVICE, START etc).

In various embodiments, pre-empting service component 122 can identify opportunities where service requests can be initiated earlier (e.g. pre-emptively invoked) to reduce a response time attributed to waiting for one or more responses. In various embodiments, service requests could be inferred by pre-empting service component 122, for example, when execution control is passed outside of this program. However, in some embodiments, a user create/generate a list of services that are suitable for the pre-emptive calling (either because they are called in transaction or because they are read-only for example), via UI 106. Some embodiments can then assess and/or prioritize identified events based on the user generated list of services to determine which service and/or identified event(s) benefit from being called earlier (e.g. pre-emptively called).

Furthermore, in one example, application (ProgA) executes and eventually requests the canonical address of the user based upon the house number and postcode provided to the application. An exemplary process flow of this first example is illustrated in FIG. 6, wherein the service provider of the AddressService takes a few seconds to respond.

Figure 7:
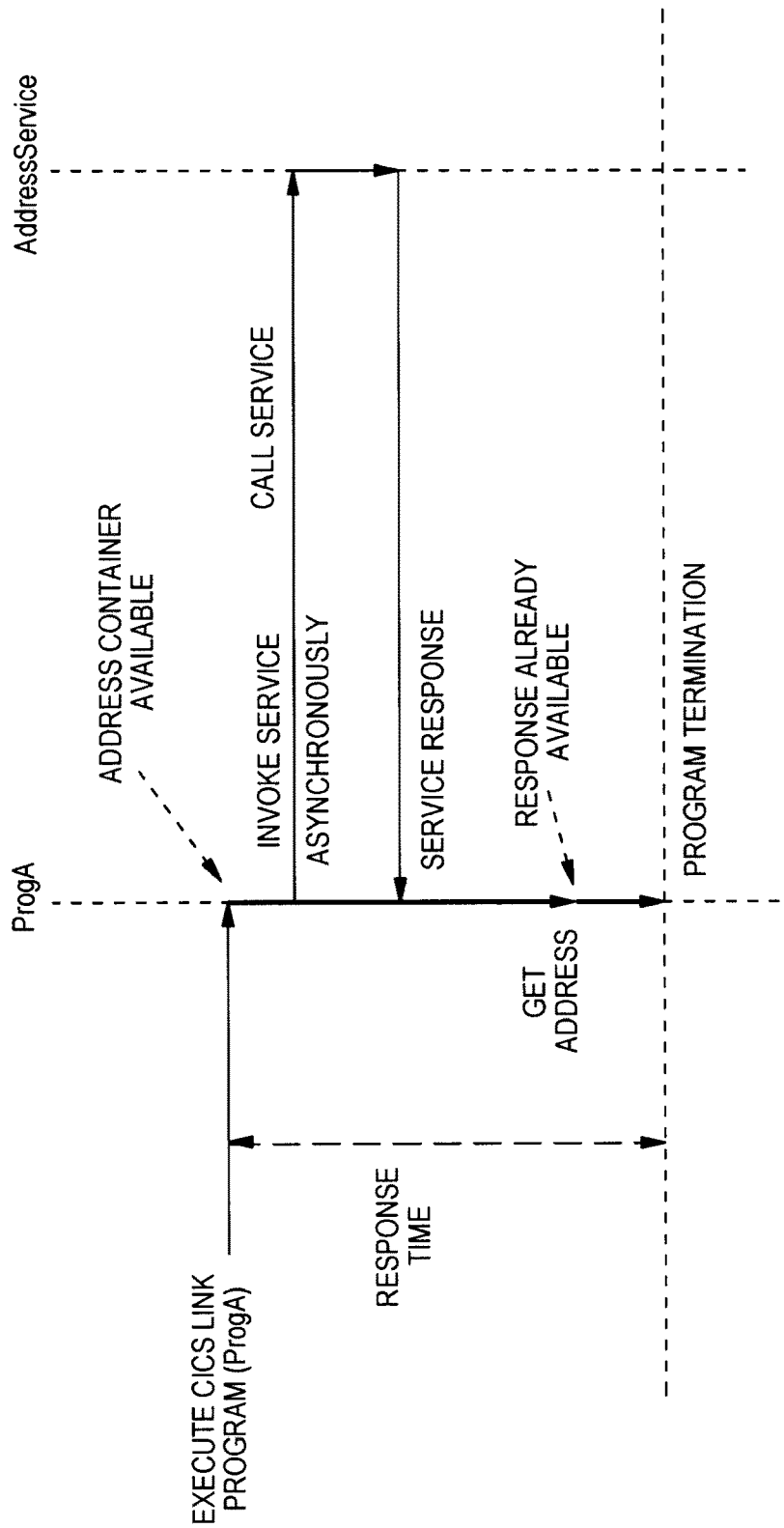
FIG. 7 depicts one embodiment of the present invention.

However, in various embodiments, pre-empting service component 122 can identify that the input to the service originates from a named input container. Additionally, in various embodiments, pre-empting service component 122 can identify that the container is never updated before the service request is made. Therefore, in various embodiments, pre-empting service component 122 can suggest that the service call can be initiated immediately upon application initiation, thus resulting in a process flow as illustrated in FIG. 7. FIG. 7 illustrates a modification to the process flow of FIG. 6 resulting from initiating the service call pre-emptively Therefore, in this particular example, pre-empting service component 122 provides information that the "GetAddress" service for "AddressService" is a good for calling pre-emptively as soon as PROGA is initiated.

Figure 8:
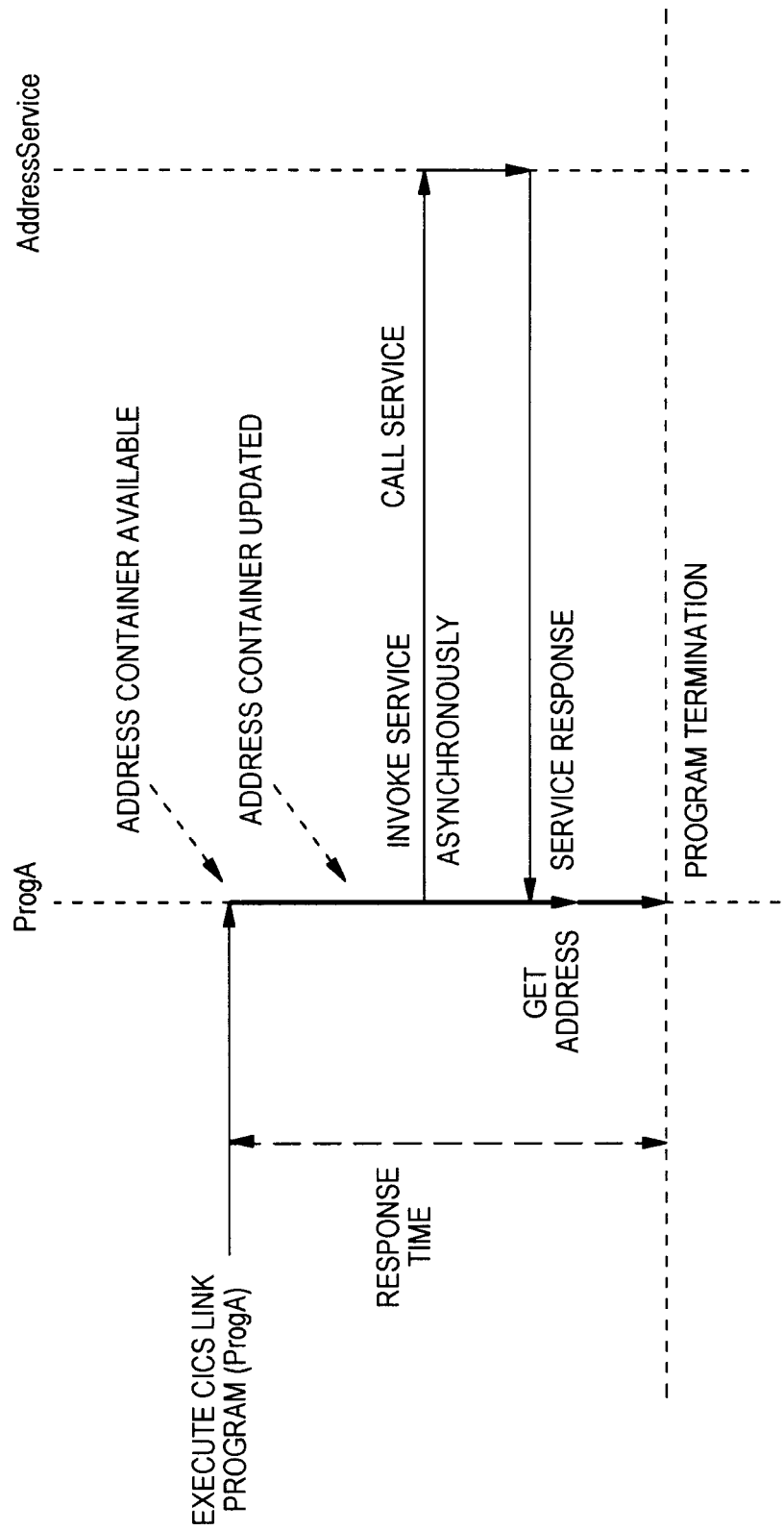
FIG. 8 depicts one embodiment of the present invention.

In another example, there is a subroutine within the application (ProgA) that updates the input container to replace the address from a residential to business address. In this particular example, after the subroutine performs the container is not updated again before the service request is made. An exemplary process flow of this first scenario is illustrated in FIG. 8, wherein the relative timing of the container being updated is depicted by an arrow labelled "Address Container Updated". FIG. 8 illustrates a modification to the process flow of FIG. 6 resulting from initiating the service call pre-emptively, wherein there is a subroutine within the application that updates the input container to replace the address from a residential to business address.

In this particular example, pre-empting service component 122 can therefore provide information that the "GetAddress" service for "AddressService" is a good for calling pre-emptively as soon as the ADDRESS container is updated (as depicted in FIG. 8).

It will thus be appreciated that optimizing the identification of eligible pre-emptive service requests in an application improves efficiency. Therefore, it is critical to locate and identify pre-emptive service requests. Additionally, there can be a reduced risk associated with arranging such pre-emptive requests by not requiring the user to understand all code paths of the application logic.

Furthermore, in an embodiment, pre-empting service component 122 can obtain an understanding of the actual response time of the AddressService (by using monitoring information for example). In this particular embodiment, pre-empting service component 122 can suggest a range of the source code in which the service request can be made in order for the response to be available in time. For example, if the AddressService takes one ("1") second to respond and the result is required five ("5") seconds into the execution of the application, pre-empting service component 122 can determine that the service does not need to be initiated immediately (but can instead be initiated any time in the first four ("4") seconds), for the result to be available when required. Such a proposed approach can offer a method for ordering and giving priorities for situations where more than one service is identified as being able to be pre-emptively invoked.

In another example, pre-empting service component 122 can also be adapted to cater for another scenario wherein an organization has many applications, which make thousands of external service requests. An approach which provides a high number (e.g. around 1000 or more) possible service requests that could potentially be made pre-emptively will not be considered useful. In this particular example, to address this, pre-empting service component 122 can prioritize the large number of identified service requests that could potentially be made pre-emptively. In this particular example, pre-empting service component 122 can do this in a number of ways, such as: by prioritizing service calls by frequency of use; and/or by ordering/arranging the suggestion list by how early the preemptive calls can be made (e.g. if the service can be invoked a single instruction ahead of where it currently is, it can be would be a low priority, whereas a service call that can be initiated at program startup can be a high priority).

In various embodiments, pre-empting service component 122 can enhance an event processing system by reducing costs per user while maximizing quality of service. In various embodiments, pre-empting service component 122 can also enable flexibility to provide higher qualities of service for particular users (e.g. user paying an additional fee). In these embodiments, pre-empting service component 122 can extend or improve the processing capabilities or efficiency of a iSaaS system or component.

Figure 4:
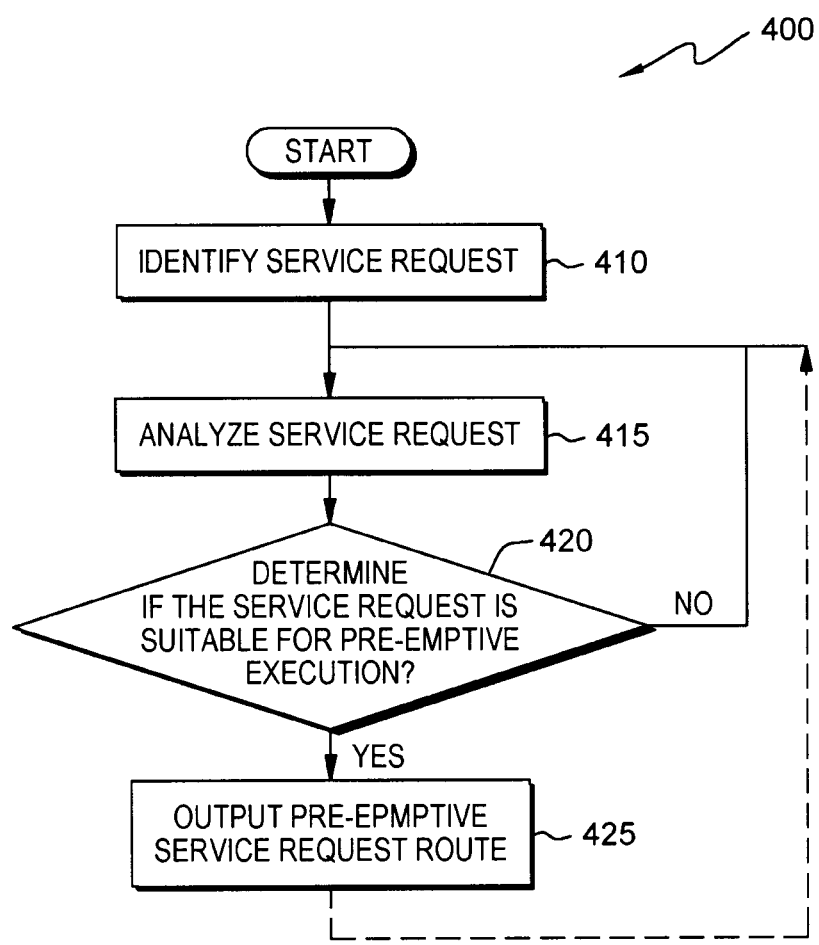
FIG. 4 is a flowchart depicting a method for optimizing the number of pre-emptive service requests in an application based on identifying a plurality of pre-emptive execution eligible service requests according to an embodiment.

FIG. 4 is a flowchart depicting a method for outputting pre-emptive service request s, on server computer 120 within distributed data processing environment 300 of FIG. 3, in accordance with an embodiment of the present invention. It should be appreciated that FIG. 4 provides only an illustration of one implementation and does not imply any limitations with regard to the environments in which different embodiments can be implemented. Many modifications to the depicted environment can be made. In an embodiment, and an exemplary context for the method, the processing system is adapted to implement services in a cloud environment, and more particularly the processing system is adapted to implement a part of a micro-service-oriented architecture (micro-service). Accordingly, a service request of the application may comprise a request for a micro-service. Generally, a micro-service is a method of developing software applications as a suite of independently deployable, small, modular services in which each service runs a unique process and communicates through a well-defined, lightweight mechanism to serve a goal.

In step 410, pre-empting service component 122 identifies a service request of the application. In various embodiments, pre-empting service component 122 can identify where the service request of the application takes place, i.e., the location of the service request in the application and/or the logic path(s) to the service request. For example, an application which at some point in its processing is required to retrieve the customers address given the house number and postcode. In this example, it is typical that the application will have done some sort of processing before it gets to the stage of requiring the address. It will then request the address from the external service and wait for the response, which constitutes a service request. In this example, once the address reply is obtained, the application can continue. It should be noted that the use of location refers to the location of the service request in the application and/or the logic path(s) to the service request.

In step 415, pre-empting service component 122 analyzes the identified service request. In various embodiments, pre-empting service component 122 can analyze one or more identified service request of an application. In various embodiments, analyzing the one or more service requests can comprise analyzing source code of the application, application logic of the application, a component or resource of the application, status changes of the application, and/or input/output data flows of the application.

In step 420, pre-empting service component 122 determines if the service request is suitable/eligible for pre-emptive execution. In various embodiments, pre-empting service component 122 can determine if one or more service requests can be executed at an earlier point in the application logic of the application based on one or more indicators of suitability for pre-emptive execution. Such indicators of suitability for pre-emptive execution can be but are not limited to: input data; output data; service request timing; service request type; service request originator; and a service request identifier. For example, the identified service request can be checked against one or more indicators of suitability by matching characteristics and/or properties of the service request and/or the service against the indicators.

In another embodiment, pre-empting service component 122 can determine if one or more service request can be executed at an earlier point in the application logic of the application based on trace information obtained from an execution of the application. For example, the application can comprise a trace element that generates a trace event during execution of the application, and the trace information can then comprise information relating to the trace event. Such trace information can be analyzed to determine if the service request can be executed at an earlier point in the application logic of the application. In a different embodiment, pre-empting service component 122 can determine if the service request can be executed at an earlier point in the application logic of the application based on monitoring information obtained from monitoring an execution of the application.

In various embodiments, if pre-empting service component 122 determines that the service request can be executed at an earlier point in the application logic of the application (yes, step) the method proceeds to step 430. However, in various embodiments, if pre-empting service component 122 determines that the service request cannot be executed at an earlier point in the application logic of the application (No, step), pre-empting service component 122 can return to step 410 to identify another service request. In another embodiment, not depicted in FIG. 4, if pre-empting service component 122 determines that the service request cannot be executed at an earlier point in the application logic of the application (No, step), method can end.

In step 425, pre-empting service component 122 outputs an identity of a service request for pre-emptive execution. In various embodiments, pre-empting service component 122 can output one or more pre-emptive service requests based on the one or more suitable/eligible service requests. For example, such identification of an outputted pre-emptive service request can be implemented by way of a flag or status indicator, such as a simple 'on/off' indicator or a more scalar indicator like a 'score', 'probability' or 'stability value' (which can allow identified service requests to be ordered later). In various embodiments, the method can then return to step 415 to repeat the process of identifying another service request (if appropriate). In various embodiments, responsive to determining the one or more service requests are eligible, pre-empting service component 122 can output one or more identities of the one or more service requests, respectively, for pre-emptive execution. An Identity can be, but is not limited to, a pointer location, one or more line numbers in a source code, module name, a memory address location, a function name, an indicator, and/or any other forms of identifying and/or labeling service requests and/or source code known in the art.

Figure 5:
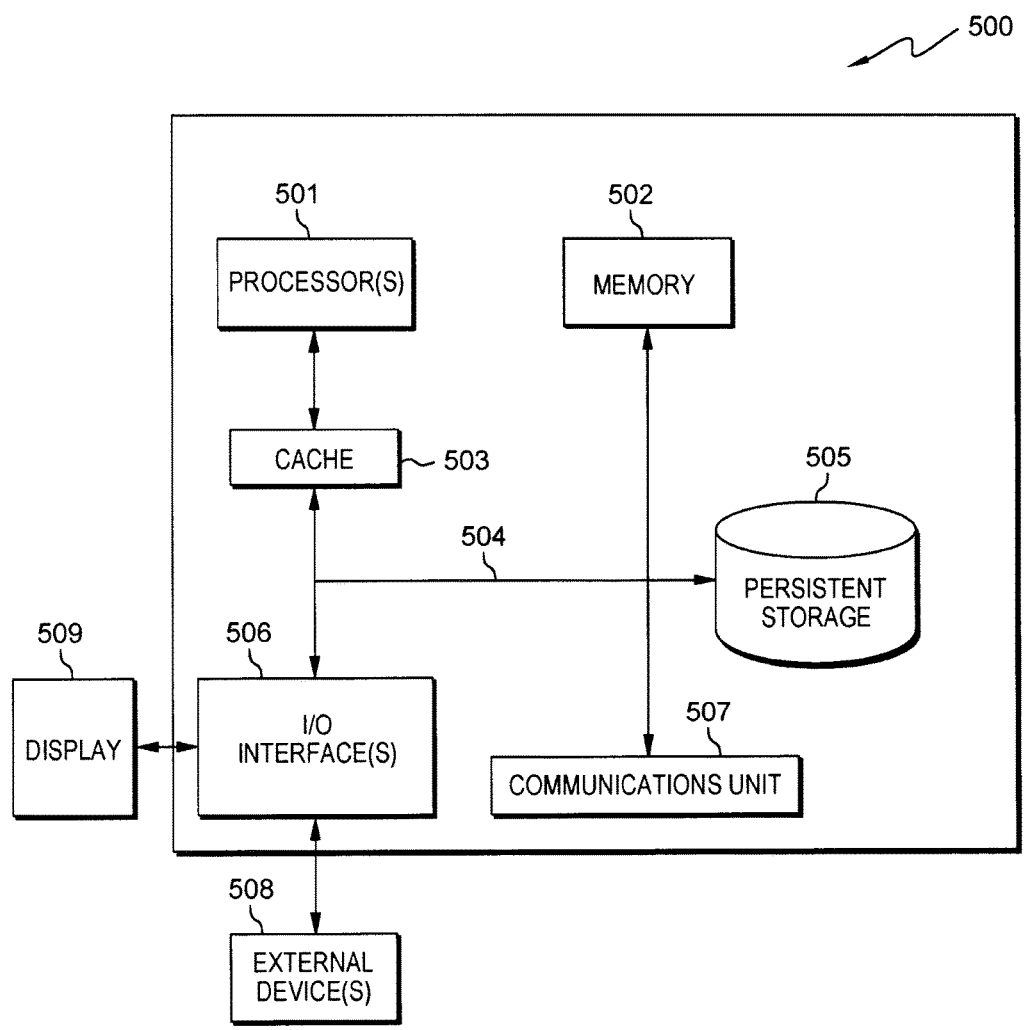
FIG. 5 depicts a block diagram of components of the server computer executing the calibration component within the distributed data processing environment of FIG. 1, in accordance with an embodiment of the present invention.

FIG. 5 depicts computer system 500, where server computer 120 represents an example of computer system 500 that includes disease progression component 122. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

What is claimed is:

1. A method for optimizing the number of pre-emptive service requests in an application based on identifying, during the application execution, a plurality of pre-emptive execution eligible service requests, the method comprising:
    identifying, by one or more processors, one or more locations, associated with one or more service requests, respectively, in an application that can be invoked at an earlier point in the application logic, wherein the application comprises a subroutine that updates an input container to replace an address, and wherein the service request comprises a request for a micro-service;
    analyzing, by the one or more processors, the one or more service requests based on the one or more locations, wherein analyzing comprises: interpreting source code of the application, logic flow of the application, a component of the application, a resource of the application, external calls of the application, internal calls of the application, timing of application events, status changes of the application, input data flows of the application, and output data flows of the application;
    determining, by the one or more processors, if the one or more service requests are eligible for pre-emptive execution based on the analyzing, wherein determining if the one or more service requests are eligible is based on trace information obtained from an execution of the application, and wherein determining if the one or more service requests are eligible further comprises a trace element that generates a trace event during execution of the application, and wherein the trace information comprises information relating to the trace event, and wherein determining if the one or more service requests are eligible further comprises:

monitoring, by the one or more processors, an application during execution based on: time of events, external calls, internal calls, resource usage, I/O data, status, usage counts and execution time, and observe one or more service requests used in existing processing and identify those that can benefit from pre-emptive execution; and responsive to determining the one or more service requests are eligible, outputting, by the one or more processors, one or more identities of the one or more service requests, respectively, for pre-emptive execution, wherein the one or more identities comprise one or more indicators of suitability for pre-emptive execution, wherein the one or more indicators of suitability for pre-emptive execution comprises: input data, output data, service request timing, service request type, execution context, service request originator, or a service request identifier.

\* \* \* \* \*